United States Patent [19]
Yatka et al.

[11] Patent Number: 5,952,019
[45] Date of Patent: Sep. 14, 1999

[54] CHEWING GUM CONTAINING GUM TALHA

[75] Inventors: Robert J. Yatka, Orland Park; Lindell C. Richey, Lake Zurich, both of Ill.; Michael A. Reed, Merrillville, Ind.; Jeffrey S. Hook, Palos Hills, Ill.; Fred R. Wolf, West Des Moines, Iowa

[73] Assignee: Wm. Wrigley Jr. Company, Chicago, Ill.

[21] Appl. No.: 09/142,773

[22] PCT Filed: Mar. 14, 1996

[86] PCT No.: PCT/US96/03508

§ 371 Date: Nov. 18, 1998

§ 102(e) Date: Nov. 18, 1998

[87] PCT Pub. No.: WO97/33485

PCT Pub. Date: Sep. 18, 1997

[51] Int. Cl.$^6$ ............................................. A23G 3/30
[52] U.S. Cl. ......................................... 426/3; 426/5
[58] Field of Search ................... 426/3, 4, 5, 6

[56] References Cited

U.S. PATENT DOCUMENTS

| | | |
|---|---|---|
| 3,352,689 | 11/1967 | Bilotti . |
| 3,576,663 | 4/1971 | Signorino et al. . |
| 4,010,283 | 3/1977 | Canonne ................................. 426/100 |
| 4,238,475 | 12/1980 | Witzel et al. .............................. 424/48 |
| 4,271,197 | 6/1981 | Hopkins et al. ............................. 426/3 |
| 4,317,838 | 3/1982 | Cherukuri et al. ........................... 426/5 |
| 4,576,737 | 3/1986 | Johnson . |
| 4,681,766 | 7/1987 | Huzinec et al. ............................. 426/5 |
| 4,786,511 | 11/1988 | Huzinec et al. ............................. 426/5 |
| 5,084,298 | 1/1992 | Hussein et al. .......................... 426/3 X |
| 5,124,162 | 6/1992 | Bošković et al. ........................... 426/96 |
| 5,135,761 | 8/1992 | Dave et al. ................................... 426/5 |

FOREIGN PATENT DOCUMENTS

| | | |
|---|---|---|
| 0455598 | 11/1991 | European Pat. Off. . |
| 0545632 | 6/1993 | European Pat. Off. . |
| 0625311 | 11/1994 | European Pat. Off. . |
| 2476986 | 2/1980 | France . |
| 55-9177 | 3/1980 | Japan . |
| 62-146562 | 6/1987 | Japan . |
| 87-2848 | 4/1987 | South Africa . |
| 1472787 | 5/1977 | United Kingdom . |
| 1572536 | 7/1980 | United Kingdom . |
| 2115672 | 9/1983 | United Kingdom . |
| WO95/08928 | 4/1995 | WIPO . |
| WO95/17104 | 6/1995 | WIPO . |
| WO97/33485 | 9/1997 | WIPO . |

OTHER PUBLICATIONS

Specifications for various spray dried gum arabic and gum talha products. Importers Service Corporation. (no date) 13 pages, published in US.

Phillips, GO and PA Williams. "The specification of the Gum Arabic of Commerce" *Food hydrocolloids: Structures, Properties and Functions* (1994) pp. 45–63, published in US.

*Primary Examiner*—Arthur L. Corbin
*Attorney, Agent, or Firm*—Steven P. Shurtz; Brinks Hofer Gilson & Lione

[57] ABSTRACT

Chewing gums containing gum talha and methods of making such gums are disclosed. In one embodiment, the gum comprises about 5% to about 95% gum base, about 0.1% to about 10% flavoring agent and gum talha, the gum talha being part of the bulking agent in the gum. The gum talha provides the gum with unique properties, and the gum is non-cariogenic. In another embodiments, the gum talha is codried with sweeteners or coevaporated with a plasticizing syrup to produce unique sweetening ingredients and syrups for gum. The gum talha may also be provided in the form of a rolling compound on the gum, or used with sugars or polyols to form a hard coating for a coated pellet gum.

14 Claims, No Drawings

CHEWING GUM CONTAINING GUM TALHA

BACKGROUND OF THE INVENTION

The present invention relates to improved compositions of chewing gum. More particularly, the invention relates to improving chewing gum by the use of specific bulking agents in sugar and non-sugar chewing gum products to give improved texture, moisture absorption properties, and improved shelf life properties. The improved chewing gum compositions may also be used in a variety of chewing gum products such as confectionery coated chewing gum products.

In recent years, efforts have been devoted to replace sugar and sugar syrups normally found in chewing gum with other carbohydrates and non-carbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers.

The non-sugar polyols have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like food ingredient for chewing gum that would act as a bulking agent, but not contribute to dental caries nor cause gastrointestinal disturbances.

One such bulking agent is called gum talha, a natural gum derived from species of plants from the Acacia genus. Gum arabic is a another common natural gum derived from a different species of plants within the Acacia genus. Gum talha is approved for use in food products, including chewing gum, in the U.S. and other countries. Although a carbohydrate, gum talha is a natural gum that does not contribute to dental caries, nor does it cause gastro-intestinal disturbances. Thus, this ingredient's use in chewing gum could be a definite improvement.

The use of liquid and powder gum arabic in chewing gum was disclosed in U.S. Pat. No. 3,352,689. It was also disclosed in a non-sweet chewing gum in U.S. Pat. No. 5,084,298. As a chewing gum binder, gum arabic was disclosed in U.S. Pat. No. 4,271,197 with hydrogenated starch hydrolyzates, in PCT Patent Publication No. WO95/08928 with erythritol, and Japanese Patent Publication No. 80-9177 with sorbitol, mannitol, and stevioside. Japanese Patent Publication No. 87-146562 disclosed using gum arabic to make a rice cake-like gum.

The use of gum arabic has been disclosed in various chewing gum or confectionery coating or panning applications. U.S. Pat. No. 3,576,663 discloses the use of gum arabic combined with a sucrose coating. U.S. Pat. No. 4,317,838, South Africa Patent Publication No. 87-2848, Great Britain Patent Publication No. 2,115,672, and European Patent Publication No. 0 625 311, disclose gum arabic combined with various polyols to make sugarless coatings. In U.S. Pat. No. 5,135,761 discloses applying gum arabic after an emulsifier subcoating. Also, sugarless coatings containing calcium chloride with gum arabic are disclosed in U.S. Pat. Nos. 4,681,766 and 4,786,511.

Gum arabic has been used in a wide variety of encapsulation applications. It is commonly used to emulsify and spray dry flavor compositions. European Patent Publication No. 0 545 632 discloses a spray dried flavor composition and European Patent Publication No. 0 455 598 discloses a microencapsulated flavor coated with gum arabic, and gluteraldehyde. U.S. Pat. No. 4,576,737 discloses gum arabic encapsulation of volatile liquids. U.S. Pat. No. 5,124,162 discloses a citrus oil in maltose and maltodextrin coated with gum arabic. Great Britain Patent Publication No. 1,472,787 discloses a flavor on a gum arabic carrier. Great Britain Patent No. 1,572,536 and PCT Patent Publication No. WO95/17104 disclose gum arabic as an encapsulating agent for aspartame. French Patent Publication No. 2,476,986 discloses vitamin C encapsulated with gum arabic.

SUMMARY OF THE INVENTION

The present invention is a method of producing chewing gum with gum talha, as well as the chewing gum so produced. The bulking agent may be added to sucrose-type gum formulations, replacing a small or large quantity of sucrose. The formulation may be a low- or high-moisture formulation containing low or high amounts of moisture-containing syrup. The bulking agent, gum talha, may also be used in low- or non-sugar gum formulations replacing sorbitol, mannitol, other polyols, or carbohydrates. Non-sugar formulations may include low- or high-moisture, sugar-free chewing gums.

The bulking agent, gum talha, may be combined with other bulking agents for use in chewing gum, including but not limited to sucrose, dextrose, fructose, maltose, maltodextrin, xylose, as well as sugar alcohols including but not limited to sorbitol, mannitol, xylitol, maltitol, lactitol, palatinit and hydrogenated starch hydrolyzates such as Lycasin. The bulking agent, gum talha, may be combined in the gum formulation or co-dried or blended with the other bulk sweeteners prior to use in the gum formulation. Co-drying may be done by various methods of spray drying, fluid bed coating, coacervation, and other granulating or agglomerating techniques. The bulking agent, gum talha, may also be combined with high potency sweeteners including, but not limited to, thaumatin, aspartame, acesulfame K, sodium saccharin, glycyrrhizin, alitame, cyclamate, stevioside and dihydrochalcones.

This material, when used as a bulking agent, gives chewing gum an improved texture, an improved shelf life and unique flavor/sweetness quality. Even though gum talha is a carbohydrate, it is not cariogenic, nor does it cause gastrointestinal disturbances, giving a highly consumer-acceptable chewing gum product.

DETAILED DESCRIPTION OF THE PREFERRED EMBODIMENTS

Acacia gums, also sometimes referred to as gum arabic, are defined in the pharmacopeias as "the air-hardened gummy exudates flowing naturally or obtained by incision of the trunk and branches of *Acacia senegal* and other species of African origin." Though there are many Acacia species (some 700), few are able to provide the amounts of gum required for industrial production. Generally, acacia gums are grown, harvested, and exported by Senegal, Mali, Nigeria, Chad and the Sudan.

Most definitions imply that the main component for acacia gum or gum arabic is from *Acacia senegal,* which undoubtedly is the most available gum in the commercial producing countries. The next most available gum is from *Acacia seyal.* This gum is from another species from the genus Acacia and is called gum talha.

Gum talha from *Acacia seyal* has a slightly different composition compared to gum arabic from gum senegal. Some differences are noted below:

|  | Gum Arabic | Gum Talha |
| --- | --- | --- |
| Optical rotation | 26–34° | 51° |
| Nitrogen, % | 0.27–0.39% | 0.14% |
| Equivalent weight | ~1100 | 1470 |
| Glucuronic acid, % | 12–28% | 6.5% |

Also, differences in component sugar in the structure of the different gums can be seen in the levels of D-Galactose, L-Arabinose, L-Rhammose, D-Glucuronic acid, and 4-0 methyl glucuronic acid.

Because of the differences in gum arabic and gum talha, these gums may function differently when used in various products. Gum talha has less nitrogen, which means it has less protein than gum arabic, and as a result may not have the same emulsifying properties, adhesive properties, or film forming properties as gum arabic. Even though it has a slightly highly equivalent weight, its viscosity is low and can affect its handling and physical characteristics when used in products.

To compensate for some of the differences in physical properties of gum arabic and gum talha, it may be possible to add protein or starches to a gum talha solution to improve its emulsifying and adhesive properties. Gum arabic and gum talha contain both AGP (arabinogalactan-protein complex) and GP (glycoprotein) but gum talha, having a lower level of protein, has lower amounts of these materials. By increasing the protein level in a gum talha solution, more emulsifying or adhesive properties may result. Typical proteins include gelatin, casein, soy, wheat gluten and zein.

Previous patents have discussed the use of acacia gum in chewing gum that may generally refer to the use of gum arabic. Also acacia gums used in coatings of gum pellets may also refer to the gum arabic materials commonly used with sugar or xylitol gum coatings. On the other hand, gum talha from *Acacia seyal* has not been previously disclosed in chewing gum formulations or in pellet gum coatings.

Gum talha from *Acacia seyal* and gum arabic from *Acacia senegal* are available from ISC (Importers Service Corporation), 233 Suydom Ave., Jersey City, N.J. Both gums are available in crude, granular, powder, and spray dried forms. All forms of gum talha are included when referring to gum talha herein, including a syrup form produced when gum talha is dissolved in water.

Gum talha may be added to chewing gum in its powder form or may be dissolved in water. Its solubility in water is about 40% at room temperature, but increases with increased temperature. Gum talha may be used in chewing gum as a texture and flavor modifier, bulking agent, and may improve texture, flavor, and shelf life properties. Gum talha may replace solids like sucrose, dextrose or lactose when used in its powder form, or may replace syrups when used in its liquid or syrup form. At levels of about 0.5% to about 25%, gum talha may replace part of the solids in sugar gum or, as a liquid, all or part of the syrup in sugar gum. At higher levels of about 25% to about 70% of the gum formulation, gum talha may replace all of the solids in a chewing gum formulation.

Unique chewing gum formulations can be obtained when all bulk sweeteners are replaced with gum talha powder and syrup. The low sweetness intensity allows for use of unique flavor combinations. High intensity sweeteners may be added to increase sweetness to obtain a sweetness more typical of chewing gum formulations. The relatively lower solubility of gum talha compared to sucrose could modify the chew texture and shelf life properties significantly. Chewing gum formulations with gum talha may contain a very low amount of moisture in the gum formulation, i.e., below about 2%, or may contain a medium amount of moisture, about 2–5%, and may even be a soft gum formulation containing 5% moisture or more.

Gum talha's unique anti-caries properties suggest it may be used in chewing gum formulations containing non-sugar ingredients. Non-sugar ingredients are alditols such as sorbitol, mannitol, xylitol, lactitol, palatinit (Isomalt), maltitol and hydrogenated starch hydrolyzates. These alditols are used in a variety of combinations to develop unique sugarless chewing gum formulations. Gum talha may be used to replace the individual alditols or combinations of alditols. With partial replacement of one or more alditols, gum talha can be used at levels of about 0.5–25%. If gum talha replaces a large amount or most of the alditols, this level may be about 25% to about 90% of the gum formulation.

Some sugar-free chewing gum formulations contain high levels of glycerin and are very low in moisture, i.e., less than about 2%. Gum talha solids or syrup may replace part or all of the glycerin used in these types of formulations. At higher moisture levels (more than 2%) in sugar-free gum, a liquid sorbitol (70% sorbitol, 30% water) is used. Gum talha solids or gum talha syrup may replace part or all of the sorbitol liquid. New sugar-free syrups like hydrogenated starch hydrolyzates, such as Lycasin, may also be replaced in part or totally by gum talha solids or syrup. The same product advantages found with hydrogenated starch hydrolyzates syrups, such as improved product shelf life, improved texture and improved aspartame stability, may also be found with the use of gum talha solids or syrup.

Recent advances use hydrogenated starch hydrolyzates (HSH) and glycerin preblended and co-evaporated to reduce moisture in some sugar-free gum formulations. Gum talha solids and/or syrup may be used to replace part or all of the HSH/glycerin blends in chewing gum formulations. Aqueous gum talha solids and/or gum talha syrup may also replace HSH in the preblend with glycerin and be co-evaporated with glycerin to obtain a low moisture, non-crystallizable blend. Combinations of gum talha solids/syrup with alditols like sorbitol, maltitol, xylitol, lactitol and mannitol in aqueous form may also be blended with glycerin and co-evaporated for use in low-moisture, sugar-free gum.

In a similar manner, gum talha solids/syrup preblended in glycerin and co-evaporated may be used in conventional sugar chewing gum formulations. Gum talha may be combined with other sugars like dextrose, sucrose, lactose, maltose, invert sugar, fructose and corn syrup solids to form a liquid mix to be blended with glycerin and co-evaporated. Gum talha solids/syrup may also be mixed with syrup and blended with glycerin and co-evaporated for use in a sugar chewing gum formulation.

Gum talha bulking agent may also be co-dried with a variety of sugars such as sucrose, dextrose, lactose, fructose and corn syrup solids and used in a sugar-containing gum formulation. Gum talha may be co-dried with a variety of alditols such as sorbitol, mannitol, xylitol, maltitol, palatinit and hydrogenated starch hydrolyzates and used in a sugar-free gum formulation. Co-drying refers to methods of co-crystallization and co-precipitation of gum talha with other sugars and alditols, as well as co-drying by encapsulation, agglomeration and absorption with other sugars and alditols.

These techniques include, but are not limited to, spray drying, spray chilling, fluid-bed coating and coacervation. These encapsulation techniques that give partial encapsulation or full encapsulation can be used individually or in any combination in a single step process or multiple step process. Generally, delayed release of bulk sweetener is obtained in multistep processes like spray drying the bulk sweetener and then fluid-bed coating the resultant powder.

Like gum arabic, gum talha can be used alone to encapsulate or partially encapsulate sugars and polyols, high intensity sweeteners, and natural and synthetic flavors. High intensity sweeteners such as aspartame, alitame, acesulfame K, salts of acesulfame, cyclamate and its salts, saccharin and its salts, sucralose, thaumatin, monellin, dihydrochalcone, stevioside, glycyrrhizin, and combinations thereof may be encapsulated in gum talha. When added to chewing gum, a fast release sweetener is obtained. Also, fast release flavors may result when encapsulated in gum talha.

The gum talha may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulking agent is dissolved in the center-fill liquid and the amount of bulk sweetener added to the center-fill liquid may be about 0.1% to about 20% by weight of the entire chewing gum formula. This method of using the bulking agent in chewing gum can allow for a lower usage level of the bulking agent, can give the bulking agent a smooth release rate, and can reduce or eliminate any possible reaction of the bulking agent with gum base, flavor components or other components, yielding improved shelf stability.

Another method of using the gum talha bulking agent is to add gum talha to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises gum talha alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of weight of the chewing gum composition. The amount of gum talha added to the rolling compound is about 0.5% to 100% of the rolling compound or about 0.005% to about 5% of the chewing gum composition. This method of using gum talha in the chewing gum can allow a lower usage level of the bulking agent.

Another method of using the gum talha bulking agent is to use it in the coating/panning of a pellet chewing gum. Pellet or ball gum is prepared as conventional chewing gum, but formed into pellets that are pillow shaped or into balls. The pellets/balls can be then sugar coated or panned by conventional panning techniques to make a sugar-coated pellet gum. The bulking agent is very stable and highly water soluble, and can be easily added to a sugar solution prepared for sugar panning.

Gum talha may be combined with sucrose, dextrose, maltose, xylitol, lactitol, palatinit, erythritol, maltitol and other new alditols in a solution to make a sugar coated pellet gum or a polyol coated pellet gum. Gum talha can also be used alone in solution in an initial gumming stage where aqueous gum talha is applied as a coating and then a powdered gum talha is added to dry the solution, as may be done in some types of "soft" panning procedures. Levels for the use of gum talha in the coating may be about 0.5 to about 20% in a sugar or polyol hard coating, or may be about 5% to 100% of dry solids in the solution or as dry powder used in the soft panning process. This process may then continue with other materials by alternating liquid and powder applications. The amount of gum talha applied may be about 0.1% to 20% of the weight of the chewing gum product, where the coating may be about 10% to 50% of the weight of the finished pellet product.

Like gum arabic, gum talha has many properties that make it an excellent coating and panning modifier. A panning modifier can improve the hardness of the coating to make it tougher, increase stickiness of coating to improve adhesion to the gum surface, especially edges, and gives additional film strength to improve shelf life of the product by protecting the gum core. Other panning modifiers which may be used in combination with gum talha are gum arabic, maltodextrin, corn syrup, corn syrup solids, gelatin, cellulose type materials like carboxymethyl cellulose or hydroxymethyl cellulose, starch and modified starches, vegetable gums like alginates, locust bean gum, guar gum, and gum tragacanth. Other types of panning modifiers that reduce tack or act as fillers may also be used, such as insoluble carbonates like magnesium carbonate or calcium carbonate and talc. These antitack agents allow the use of a variety of carbohydrates and sugar alcohols to be used in the development of newly panned and coated gum products.

Flavors and high intensity sweeteners may also be added with the pellet coating to yield unique product characteristics. When liquid or encapsulated flavors are added to a coating, they can behave like an antitack agent. Use of gum talha can increase tackiness and help cover the flavor and allow a continuation of the sugar or polyol coating process. Also gum talha with its emulsifying properties may help bind the flavor in the coating. High intensity sweeteners can also be entrapped and stabilized in the coating with the use of gum talha. High intensity sweeteners may be applied from the dissolved coating solution, or may be applied with the powder charge addition. Sweeteners may be encapsulated and blended with the powder charge to increase stability of the high intensity sweetener.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% by weight of the gum. More preferably the insoluble gum base comprises between 10 and 50% by weight of the gum and most preferably about 20 to about 35% by weight of the gum.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Gum bases typically also contain softeners, including glycerol monostearate and glycerol triacetate. Further, gum bases may also contain optional ingredients such as antioxidants, colors and emulsifiers. The present invention contemplates employing any commercially acceptable gum base.

The water-soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolysates, corn syrup and combinations thereof may be used as softeners and binding agents in gum. An aqueous solution of gum talha can also be used as a softener and binding agent in gum.

As mentioned above, the gum talha bulking agent of the present invention will most likely be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The gum talha bulking agent of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

Depending on the particular sweetness release profile and shelf-stability needed, the gum talha bulking agent of the present invention can also be used in combination with coated or uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

After the chewing gum center has been manufactured and shaped, as described above, the sugar or polyol coatings can be applied. Pellet or ball gum is prepared as conventional chewing gum, but formed into pellets that are pillow-shaped or ball-shaped. The pellets or balls can then be coated or panned by conventional panning techniques to make a unique, coated pellet gum. The sugar or polyols used in the coatings are very stable and highly water soluble, and can be easily added to water to make a solution prepared for panning. Sugars or polyols may be combined with other polyols or sugars, or used alone in solution as the coating on pellet gum. Sugar or polyols can also be added as a powder blended with other powders often used in some types of conventional panning procedures. Sugars or polyols can also be used with panning modifiers and other panning materials to improve product quality. Antitack agents may also be added as panning modifiers, which allow the use of a variety of carbohydrates and sugar alcohols to be used in the development of new panned or coated gum products.

The coating is initially present as a liquid syrup which contains from about 30 to about 80 or 85 weight percent of the coating ingredients previously described herein, and from about 15 to 20 to about 70 weight percent of a solvent such as water. In general, the hard coating process is carried out in a rotating pan. Sugarless gum center tablets to be coated are placed into the rotating pan to form a moving mass.

The material or syrup which will eventually form the hard coating is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In the hard coating panning procedure, syrup is added to the gum center tablets at a temperature range of from about 100° F. to about 250° F. Preferably, the syrup temperature is from about 150° F. to about 200° F. throughout the process in order to prevent the polyol in the syrup from crystallizing. The syrup may be mixed with, sprayed upon, poured over, or added to the gum center tablets in any way known to those skilled in the art.

Each component of the coating on the gum center tablets may be applied in a single hard layer or in a plurality of hard layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center tablets. More preferably, less than about 60 coats are applied and most preferably, about 30 to about 60 coats are applied. In any event, the present invention contemplates applying an amount of syrup sufficient to yield a hard coated chewing gum product containing about 10 to about 65 weight percent coating. Preferably, the final product will contain from about 20 to about 50 weight percent hard coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure.

The present invention contemplates that a flavoring agent may be added to the syrup, or applied to the gum center tablets while the syrup coating is drying or after the coating has dried. Furthermore, the flavoring agent may be applied anywhere within the sequence of coats, for example, after the third, twelfth, eighteenth, etc., coats.

Once a coating of syrup is applied to the gum center tablets, the present invention contemplates drying the wet syrup in an inert medium. A preferred drying medium comprises air. Preferably, forced drying air contacts the wet syrup coating in a temperature range of from about 80° to about 115° F. More preferably, the drying air is in the temperature range of from about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate, for large scale operations, of about a 2800 cubic feet per minute. If lower quantities of material are being processed, or if smaller equipment is used, lower flow rates would be used. If a flavoring agent is applied after a syrup coating has been dried, the present invention contemplates drying the flavoring agent with or without the use of a drying medium.

A wide range of changes and modifications to the embodiments of the invention described above will be apparent to persons skilled in the art. For example, while the invention is described with respect to hard-coated chewing gum, it will be appreciated that the process is applicable to coating other food products, such as candies, in which a coating with gum talha would have utility.

EXAMPLES

The following examples of the invention and comparative examples are provided by way of explanation and illustration.

The formulas listed in Table 1 comprise various sugar-type formulas in which gum talha can be added to gum after it is dissolved in water and mixed with various aqueous solvents.

TABLE 1

(WEIGHT PERCENT)

| | EX. 1 | EX. 2 | EX. 3 | EX. 4 | EX. 5 | EX. 6 | EX. 7 | EX. 8 |
|---|---|---|---|---|---|---|---|---|
| SUGAR | 55.6 | 56.6 | 55.6 | 47.0 | 53.0 | 53.0 | 55.6 | 47.0 |
| BASE | 19.2 | 19.2 | 19.2 | 19.2 | 19.2 | 19.2 | 19.2 | 19.2 |
| CORN SYRUP | 12.9 | 1.9 | 8.9 | 2.9 | 6.9 | 6.9 | 0.0 | 2.9 |
| PEPPERMINT FLAVOR | 0.9 | 0.9 | 0.9 | 0.9 | 0.9 | 0.9 | 0.9 | 0.9 |
| GLYCERIN | 1.4 | 1.4 | 1.4 | 0.0 | 0.0 | 0.0 | 1.4 | 0.0 |
| LIQUID/GUM TALHA BLEND | 10.0 | 20.0 | 14.0 | 30.0 | 20.0 | 20.0 | 22.9 | 30.0 |

Example 1

Gum talha powder can be added directly to the gum.

Example 2

A 60 gram portion of gum talha can be dissolved in 140 grams of water at 40° C. making a 30% solution and added to gum.

Example 3

Gum talha syrup at 40% solids can be added directly to the gum.

Example 4

A blend of 60 grams of gum talha and 140 grams of water is mixed at 40° C. To this is added 100 grams of glycerin to give a mixture of 20% gum talha, 47% water, and 33% glycerin, and added to gum.

Example 5

To 140 grams of gum talha syrup at 40% solids is added 60 grams of glycerin to give a 70% gum talha syrup with 30% glycerin, and added to gum.

Example 6

To 140 grams of gum talha syrup of 40% solids is added 60 grams of propylene glycol giving a 70% gum talha syrup with 30% glycerin and added to gum.

Example 7

To 140 grams of gum talha syrup at 40% solids is added 89 grams of corn syrup and blended giving a mixture of 61% gum talha syrup and 39% corn syrup.

Example 8

To a 200 gram quantity of corn syrup is added 100 grams of glycerin. To this mixture is added 75 grams of gum talha and blended at 50° C. This mixture is added to gum.

In the next examples of sugar gum formulations, gum talha can be dissolved in water and emulsifiers can be added to the aqueous solution. Example solutions can be prepared by dissolving 15 grams of gum talha in 70 grams water and adding 15 grams of emulsifiers of various hydrophilic-lipophilic balance (HLB) values to the solution. The mixtures can then be used in the following formulas.

TABLE 2

(WEIGHT PERCENT)

| | EX. 9 | EX. 10 | EX. 11 | EX. 12 | EX. 13 | EX. 14 |
|---|---|---|---|---|---|---|
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.9 | 12.9 | 12.9 | 12.9 | 12.9 | 12.9 |
| GLYCERIN | 1.4 | 1.4 | 1.4 | 1.4 | 1.4 | 1.4 |
| DEXTROSE MONOHYDRATE | 9.9 | 9.9 | 9.9 | 9.9 | 9.9 | 9.9 |
| PEPP. FLAVOR | 0.9 | 0.9 | 0.9 | 0.9 | 0.9 | 0.9 |
| BULKING AGENT | 5.0 | 5.0 | 5.0 | 5.0 | 5.0 | 5.0 |
| EMULSIFIER/ WATER MIXTURE | None | HLB = 2 | HLB = 4 | HLB = 6 | HLB = 9 | HLB = 12 |

Examples 15–20

The same as the formulations made in Examples 9–14, respectively, except that the flavor can be mixed together with the aqueous gum talha solution and emulsified before adding the mixture to the gum batch.

The following Tables 3 through 10 are examples of gum formulations that demonstrate formula variations in which gum talha or gum talha syrup may be used.

Examples 21–24 in Table 3 demonstrates the use of gum talha in low-moisture sugar formulations showing less than 2% theoretical moisture:

TABLE 3

(WEIGHT PERCENT)

| | EX. 21 | EX. 22 | EX. 23 | EX. 24 |
|---|---|---|---|---|
| SUGAR | 57.9 | 53.9 | 48.9 | 25.0 |
| GUM BASE | 19.2 | 19.2 | 19.2 | 19.2 |
| CORN[a] SYRUP | 6.0 | 6.0 | — | — |
| DEXTROSE MONOHYDRATE | 10.0 | 10.0 | 10.0 | 10.0 |
| LACTOSE | 0.0 | 0.0 | 0.0 | 5.0 |
| GLYCERIN[b] | 5.0 | 5.0 | 11.0 | 14.9 |
| FLAVOR | 0.9 | 0.9 | 0.9 | 0.9 |
| GUM TALHA | 1.0 | 5.0 | 10.0 | 25.0 |

[a]Corn Syrup is evaporated to 85% solids, 15% moisture
[b]Glycerin and syrup may be blended and co-evaporated Examples 25–28 in Table 4 demonstrate the use of gum talha in medium-moisture sugar formulations having about 2% to about 5% moisture.

Examples 29–32 in Table 5 demonstrate the use of gum talha in high-moisture sugar formulations having more than about 5% moisture.

TABLE 4

(WEIGHT PERCENT)

| | EX. 25 | EX. 26 | EX. 27 | EX. 28 |
|---|---|---|---|---|
| SUGAR | 52.5 | 48.5 | 43.5 | 25.0 |
| GUM BASE | 19.2 | 19.2 | 19.2 | 19.2 |
| CORN SYRUP[a] | 15.0 | 15.0 | 13.0 | 12.5 |

TABLE 4-continued (WEIGHT PERCENT)

| | EX. 25 | EX. 26 | EX. 27 | EX. 28 |
|---|---|---|---|---|
| DEXTROSE MONOHYDRATE | 10.0 | 10.0 | 10.0 | 10.0 |
| GLYCERIN[b] | 1.4 | 1.4 | 3.4 | 7.4 |
| FLAVOR | 0.9 | 0.9 | 0.9 | 0.9 |
| GUM TALHA | 1.0 | 5.0 | 10.0 | 25.0 |

[a]Corn Syrup is evaporated to 85% solids, 15% moisture
[b]Glycerin and syrup may be blended and co-evaporated

TABLE 5

(WEIGHT PERCENT)

| | EX. 29 | EX. 30 | EX. 31 | EX. 32 |
|---|---|---|---|---|
| SUGAR | 50.0 | 46.0 | 41.0 | 25.0 |
| GUM BASE | 24.0 | 24.0 | 24.0 | 24.0 |
| CORN SYRUP | 24.0 | 24.0 | 24.0 | 24.6 |
| GLYCERIN | 0.0 | 0.0 | 0.0 | 0.4 |
| FLAVOR | 1.0 | 1.0 | 1.0 | 1.0 |
| GUM TALHA | 1.0 | 5.0 | 10.0 | 25.0 |

Examples 33–36 in Table 6 and Examples 37–44 in Tables 7 and 8 demonstrate the use of gum talha in low- and high-moisture gums that are sugar-free. Low-moisture gums have less than about 2% moisture, and high-moisture gums have greater than 2% moisture.

TABLE 6

(WEIGHT PERCENT)

| | EX. 33 | EX. 34 | EX. 35 | EX. 36 |
|---|---|---|---|---|
| BASE | 25.5 | 25.5 | 25.5 | 25.5 |
| SORBITOL | 50.0 | 46.0 | 41.0 | 21.0 |
| MANNITOL | 12.0 | 12.0 | 12.0 | 12.0 |
| GLYCERIN | 10.0 | 10.0 | 10.0 | 15.0 |
| FLAVOR | 1.5 | 1.5 | 1.5 | 1.5 |
| GUM TALHA | 1.0 | 5.0 | 10.0 | 25.0 |

TABLE 7

(WEIGHT PERCENT)

| | EX. 37 | EX. 38 | EX. 39 | EX. 40 |
|---|---|---|---|---|
| BASE | 25.5 | 25.5 | 25.5 | 25.5 |
| SORBITOL | 50.0 | 46.0 | 31.0 | 6.0 |
| LIQUID SORBITOL* | 10.0 | 10.0 | 20.0 | 30.0 |
| MANNITOL | 10.0 | 10.0 | 10.0 | 10.0 |
| GLYCERIN | 2.0 | 2.0 | 2.0 | 2.0 |
| FLAVOR | 1.5 | 1.5 | 1.5 | 1.5 |
| GUM TALHA | 1.0 | 5.0 | 10.0 | 25.0 |

*Sorbitol Liquid contains 70% sorbitol, 30% water

TABLE 8

(WEIGHT PERCENT)

|  | EX. 41 | EX. 42 | EX. 43 | EX. 44 |
|---|---|---|---|---|
| BASE | 25.5 | 25.5 | 25.5 | 25.5 |
| SORBITOL | 50.0 | 44.0 | 35.0 | 15.0 |
| HSH SYRUP* | 10.0 | 10.0 | 10.0 | 10.0 |
| MANNITOL | 8.0 | 8.0 | 8.0 | 8.0 |
| GLYCERIN** | 4.0 | 6.0 | 10.0 | 15.0 |
| FLAVOR | 1.5 | 1.5 | 1.5 | 1.5 |
| GUM TALHA | 1.0 | 5.0 | 10.0 | 25.0 |

*Hydrogenated starch hydrolyzate syrup
**Glycerin and HSH syrup may be blended or co-evaporated Table 9 shows sugar chewing formulations that can be made with various other types of sugars.

TABLE 9

(WEIGHT PERCENT)

|  | EX. 45 | EX. 46 | EX. 47 | EX. 48 | EX. 49 | EX. 50 |
|---|---|---|---|---|---|---|
| GUM BASE | 19.2 | 19.2 | 19.2 | 19.2 | 19.2 | 19.2 |
| SUCROSE | 44.5 | 24.5 | 39.5 | 19.5 | 29.5 | 19.5 |
| GLYCERIN | 1.4 | 6.4 | 1.4 | 6.4 | 1.4 | 6.4 |
| CORN SYRUP | 14.0 | 14.0 | 14.0 | 14.0 | 14.0 | 14.0 |
| DEXTROSE | 5.0 | 5.0 | — | — | 10.0 | 5.0 |
| LACTOSE | 5.0 | 5.0 | 10.0 | 10.0 | — | — |
| FRUCTOSE | 5.0 | 5.0 | 10.0 | 10.0 | 10.0 | 5.0 |
| INVERT SUGAR | — | — | — | — | 10.0 | 10.0 |
| MALTOSE | — | — | — | — | — | — |
| CORN SYRUP SOLIDS | — | — | — | — | — | — |
| PEPPERMINT FLAVOR | 0.9 | 0.9 | 0.9 | 0.9 | 0.9 | 0.9 |
| GUM TALHA | 5.0 | 20.0 | 5.0 | 20.0 | 5.0 | 20.0 |

|  | EX. 51 | EX. 52 | EX. 53 | EX. 54 | EX. 55 | EX. 56 |
|---|---|---|---|---|---|---|
| GUM BASE | 19.2 | 19.2 | 19.2 | 19.2 | 19.2 | 19.2 |
| SUCROSE | 29.5 | 19.5 | 29.5 | 19.5 | 37.5 | 22.5 |
| GLYCERIN | 1.4 | 6.4 | 1.4 | 6.4 | 1.4 | 6.4 |
| CORN SYRUP | 14.0 | 14.0 | 14.0 | 14.0 | 11.0 | 11.0 |
| DEXTROSE | 10.0 | 5.0 | 10.0 | 5.0 | 10.0 | 5.0 |
| LACTOSE | — | — | — | — | — | — |
| FRUCTOSE | 10.0 | 5.0 | 10.0 | 5.0 | 5.0 | 5.0 |
| INVERT SUGAR | 10.0 | 10.0 | — | — | 5.0 | 5.0 |
| MALTOSE | — | — | 10.0 | 10.0 | — | — |
| CORN SYRUP SOLIDS | — | — | — | — | 5.0 | 5.0 |
| PEPPERMINT FLAVOR | 0.9 | 0.9 | 0.9 | 0.9 | 0.9 | 0.9 |
| GUM TALHA | 5.0 | 20.0 | 5.0 | 20.0 | 5.0 | 20.0 |

Table 10 shows chewing gum formulations that are free of sugar. These formulations can use a wide variety of other non-sugar alditols.

TABLE 10

(WEIGHT PERCENT)

|  | EX. 57 | EX. 58 | EX. 59 | EX. 60 | EX. 61 | EX. 62 |
|---|---|---|---|---|---|---|
| GUM BASE | 25.5 | 25.5 | 25.5 | 25.5 | 25.5 | 25.5 |
| GLYCERIN | 8.0 | 8.0 | 8.0 | 8.0 | 8.0 | 2.0 |
| SORBITOL | 38.0 | 28.0 | 28.0 | 23.0 | 22.0 | 10.0 |
| MANNITOL | — | 10.0 | 10.0 | 10.0 | 10.0 | 6.0 |
| SORBITOL LIQUID | 17.0 | 17.0 | — | — | — | — |
| LYCASIN | — | — | 17.0 | 12.0 | 8.0 | 20.0 |
| MALTITOL | — | — | — | 10.0 | — | — |
| XYLITOL | — | — | — | — | 15.0 | 15.0 |
| LACTITOL | — | — | — | — | — | — |
| PALATINIT | — | — | — | — | — | — |
| FLAVOR | 1.5 | 1.5 | 1.5 | 1.5 | 1.5 | 1.5 |
| GUM TALHA | 10.0 | 10.0 | 10.0 | 10.0 | 10.0 | 20.0 |

|  | EX. 63 | EX. 64 | EX. 65 | EX. 66 | EX. 67 | EX. 68 |
|---|---|---|---|---|---|---|
| GUM BASE | 25.5 | 25.5 | 25.5 | 25.5 | 25.5 | 25.5 |
| GLYCERIN | 8.0 | 8.0 | 8.0 | 2.0 | 8.0 | 2.0 |
| SORBITOL | 32.0 | 27.0 | 22.0 | 31.0 | 10.0 | 10.0 |
| MANNITOL | 8.0 | 8.0 | 8.0 | — | — | — |
| SORBITOL LIQUID | 5.0 | — | — | — | — | — |
| LYCASIN | — | 5.0 | 5.0 | 5.0 | 10.0 | 20.0 |
| MALTITOL | — | 5.0 | — | — | — | — |
| XYLITOL | — | — | — | 15.0 | 15.0 | — |
| LACTITOL | 10.0 | 10.0 | 10.0 | — | — | — |
| PALATINIT | — | — | 10.0 | 10.0 | 10.0 | 21.0 |
| FLAVOR | 1.5 | 1.5 | 1.5 | 1.5 | 1.5 | 1.5 |
| GUM TALHA | 10.0 | 10.0 | 10.0 | 10.0 | 20.0 | 20.0 |

High-intensity sweeteners such as aspartame, acesulfame K, or the salts of acesulfame, cyclamate and its salts, saccharin and its salts, alitame, sucralose, thaumatin, monellin, dihydrochalcone, stevioside, glycyrrhizin, and combinations thereof may be used in any of the Examples listed in Tables 3, 4, 5, 6, 7, 8, 9 and 10. Since gum talha has less sweetness than some of the other sugars used in sugar gum, and some of the alditols in sugar-free gum, a high-intensity sweetener may be need to obtain the proper level of sweetness.

High-intensity sweeteners may also be modified to control their release in chewing gum formulations containing gum talha. This can be controlled by various methods of encapsulation, agglomeration, absorption, or a combination of methods to obtain either a fast or slow release of the sweetener. Sweetener combinations, some of which may be synergistic, may also be included in the gum formulations containing gum talha.

The following examples show the use of high-intensity sweeteners in chewing gum formulations with gum talha.

Example 69

Aspartame at a level of 0.2% may be added to any of the formulas in Tables 3 through 10 by replacing 0.2% of the gum talha.

Example 70

Alitame at a level of 0.03% may be added to any of the formulas in Tables 3 through 10 by replacing 0.03% of the gum talha.

Example 71

Sucralose at a level of 0.07% may be added to any of the formulas in Tables 3 through 10 by replacing 0.07% of the gum talha.

Example 72

Thaumatin at a level of 0.02% may be added to any of the formulas in Tables 3 through 10 by replacing 0.02% of the gum talha.

Example 73

Glycyrrhizin at a level of 0.4% may be added to any of the formulas in Tables 3 through 10 by replacing 0.4% of the gum talha.

High-intensity sweeteners may also be combined with other high-intensity sweeteners, with or without encapsulation, agglomeration or absorption, and used in chewing gum. Examples are:

Example 44

Aspartame and acesulfame K at a 1:1 ratio may be added to any of the formulas in Tables 3 through 10 at a level of 0.15% by replacing 0.15% of the gum talha.

Example 75

Aspartame and alitame at a ratio of 9:1 aspartame:alitame may be added to any of the formulas in Tables 3 through 10 at a level of 0.1% by replacing 0.1% of the gum talha.

Example 76

Aspartame and thaumatin at a ratio of 9:1 aspartame:thaumatin can be added to any of the formulas in Tables 3 through 10 at a level of 0.1% by replacing 0.1% of the gum talha.

Example 77

Sucralose and alitame in a ratio of 3:1 sucralose:alitame can be added to any of the formulas in Tables 3 through 10 at a level of 0.5% by replacing 0.5% of the gum talha.

Example 78

Alitame and glycyrrhizin in a ratio of 1:12 alitame:glycyrrhizin can be added to any of the formulas in Tables 3 through 10 at a level of 0.1% by replacing 0.1% of the gum talha.

Example 79

Aspartame and glycyrrhizin in a ratio of 1:14 aspartame:glycyrrhizin can be added to any of the formulas in Tables 3 through 10 at a level of 0.3% by replacing 0.3% of the gum talha.

As noted earlier, the gum formulas can be prepared as stick or tab products in the sugar or sugarless type formulations. These formulas can also be made in a pellet or pillow shape pellet or a round ball or any other shape of product for coating/panning. However, gum formulas are generally adjusted to a higher level of gum base to give a more consumer acceptable size of gum bolus.

Keeping this in mind, if a coating of about 25% of the total product is added to a pellet core as sugar or polyols, the gum base in the pellet core should also be increased by 25%. Likewise, if a 33% coating is applied, the base levels should also be increased by 33%. As a result, gum centers are usually formulated with about 25% to about 40% gum base with a corresponding decrease in the other ingredients except flavor. Generally flavors increase with the level of gum base as the base tends to bind flavors into the gum and more flavor is needed to give a good flavorful product. However flavors can also be added to the coating to give increased flavor impact and more flavor perception.

Some typical sugar type gum center formulations are shown in Table 11.

TABLE 11

(WEIGHT PERCENT)

|  | EX. 80 | EX. 81 | EX. 82 | EX. 83 | EX. 84 | EX. 85 |
|---|---|---|---|---|---|---|
| SUGAR | 52.0 | 49.0 | 48.0 | 44.0 | 41.0 | 39.0 |
| GUM BASE | 26.0 | 30.0 | 35.0 | 26.0 | 30.0 | 35.0 |
| CORN SYRUP | 20.0 | 19.0 | 15.0 | 18.0 | 17.0 | 14.0 |
| GLYCERIN | 1.0 | 1.0 | 1.0 | 1.0 | 1.0 | 1.0 |
| PEPPERMINT FLAVOR | 1.0 | 1.0 | 1.0 | 1.0 | 1.0 | 1.0 |
| DEXTROSE MONOHYDRATE | — | — | — | 10.0 | 10.0 | 10.0 |

Formulations can also be made similar to those found in Tables 1–5 for low, medium, and high moisture formulas. Higher levels of base may be used with a corresponding decrease in other ingredients. Also, other sugars may be used in the gum center as found in Table 9.

Gum talha can then be used in the coating formula on the various pellet gum formulations. The following Table 12 shows some sugar and dextrose type formulas:

TABLE 12

(DRY WEIGHT PERCENT)

|  | EX. 86 | EX. 87 | EX. 88 | EX. 89 | EX. 90 | EX. 91 |
|---|---|---|---|---|---|---|
| SUGAR | 97.1 | 95.4 | 94.1 | 96.9 | 95.1 | 93.6 |
| GUM TALHA | 2.0 | 3.0 | 4.0 | 2.0 | 3.0 | 4.0 |
| TITANIUM DIOXIDE | 0.5 | 1.0 | 1.0 | — | — | — |
| CALCIUM CARBONATE | — | — | — | 0.5 | 1.0 | 2.0 |
| FLAVOR | 0.3 | 0.5 | 0.8 | 0.5 | 0.8 | 0.3 |
| WAX | 0.1 | 0.1 | 0.1 | 0.1 | 0.1 | 0.1 |

|  | EX. 92 | EX. 93 | EX. 94 | EX. 95 |
|---|---|---|---|---|
| DEXTROSE MONOHYDRATE | 97.6 | 95.4 | 97.2 | 94.5 |
| GUM TALHA | 1.5 | 3.0 | 1.5 | 3.0 |
| TITANIUM DIOXIDE | 0.5 | 1.0 | — | — |
| CALCIUM CARBONATE | — | — | 1.0 | 2.0 |
| FLAVOR | 0.3 | 0.5 | 0.2 | 0.4 |
| WAX | 0.1 | 0.1 | 0.1 | 0.1 |

The above formulations are made by making a syrup by dissolving the sugar and gum talha in solution at about 75% solids at boiling, and suspending titanium dioxide or calcium carbonate in this syrup. Flavor is not mixed with the hot syrup, but added at low levels with one or more coats. After the final coats are applied and dried, wax is applied to give a smooth polish.

The above process gives a hard shell coating. Often a dry charge of powdered sugar or dextrose monohydrate may be used. This gives a somewhat softer coating. A dry charge may be used to build up a coating, but then finished with a straight syrup to obtain a hard shell. Table 13 gives these types of formulas.

TABLE 13

(DRY WEIGHT PERCENT)

|  | EX. 96 | EX. 97 | EX. 98 | EX. 99 | EX. 100 | EX. 101 |
|---|---|---|---|---|---|---|
| SUGAR | 77.5 | 81.4 | — | — | 87.5 | — |
| DEXTROSE MONO- | — | — | 77.5 | 86.3 | — | 87.1 |

TABLE 13-continued (DRY WEIGHT PERCENT)

| | EX. 96 | EX. 97 | EX. 98 | EX. 99 | EX. 100 | EX. 101 |
|---|---|---|---|---|---|---|
| HYDRATE POWDER SUGAR* | 20.0 | 15.0 | — | — | — | — |
| POWDER DEXTROSE* | — | — | 20.0 | 10.0 | — | — |
| GUM TALHA POWDER | 2.0 | 3.0 | 2.0 | 3.0 | 8.0 | 8.0 |
| GUM TALHA SOLUTION | — | — | — | — | 4.0 | 4.0 |
| FLAVOR | 0.4 | 0.5 | 0.4 | 0.6 | 0.4 | 0.8 |
| WAX | 0.1 | 0.1 | 0.1 | 0.1 | 0.1 | 0.1 |

*Powder and/or crystalline sugar may be used.

In Examples 96–99, gum talha is blended in the sugar syrup. In Examples 100 and 101, gum talha powder is dry charged after a gum talha solution is applied in the first stages of coating, then this is followed by a hard shell coating of sugar solution or dextrose solution.

Gum talha may also be used in coating of sugarless gum centers. Like sugar gum centers, the base formulation can be increased in proportion to the amount of coating applied to the center. Formulations similar to those found in Tables 6, 7 or 8 for low and high moisture gum can be used to make gum centers. Generally, the base level may be increased to 30–46% with the other ingredients proportionally reduced. Some typical gum formulas are in Table 14.

TABLE 14

(WEIGHT PERCENT)

| | EX. 102 | EX. 103 | EX. 104 | EX. 105 | EX. 106 | EX. 107 | EX. 108 |
|---|---|---|---|---|---|---|---|
| GUM BASE | 35.0 | 35.0 | 30.0 | 30.0 | 30.0 | 40.0 | 30.0 |
| CALCIUM CARBONATE | — | — | 5.0 | 10.0 | 15.0 | — | — |
| SORBITOL | 43.3 | 45.3 | 46.3 | 40.3 | 44.8 | 41.7 | 46.5 |
| MANNITOL | 10.0 | 10.0 | 5.0 | 10.0 | — | 8.0 | 10.0 |
| GLYCERIN | — | 8.0 | 2.0 | — | 8.0 | 2.0 | 2.0 |
| SORBITOL LIQUID | 10.0 | — | 10.0 | 8.0 | — | 6.0a) | 10.0a) |
| FLAVOR | 1.5 | 1.5 | 1.5 | 1.5 | 2.0 | 2.0 | 1.3 |
| HIGH INTENSITY SWEETENER | 0.2 | 0.2 | 0.2 | 0.2 | 0.2 | 0.3 | 0.2 | a)Lycasin brand hydrogenated starch hydrolyzate used instead of sorbitol liquid

In the above center formulations, the high intensity sweetener used is aspartame. However other high intensity such as alitame, acesulfame K, salts of acesulfame, cyclamate and its salts, saccharin and its salts, sucralose, thaumatin, monellin, dihydrochalcone, stevioside, glycyrrhizin and combinations thereof may be used in any of the examples with the level adjusted for sweetness.

Lycasin and other polyols such as maltitol, xylitol, lactitol, palatinit (isomalt) may also be used in the gum center formulations at various levels similar to those shown in Table 10. The texture may be adjusted by varying glycerin or sorbitol liquid. Sweetness of the center formulation can also be adjusted by varying the level of high intensity sweetener.

Gum talha is especially useful in sugarless coatings with xylitol, sorbitol, maltitol, lactitol, isomalt (hydrogenated isomaltolose) and erythritol. Gum talha acts as a binder, film former, hardener of the coated pellet. The following table gives formulas for a xylitol coating:

TABLE 15

(DRY WEIGHT PERCENT)

| | EX. 109 | EX. 110 | EX. 111 | EX. 112 | EX. 113 | EX. 114 |
|---|---|---|---|---|---|---|
| XYLITOL | 94.8 | 92.4 | 90.7 | 90.1 | 89.9 | 88.8 |
| GUM TALHA | 4.0 | 6.0 | 7.0 | 8.5 | 8.5 | 10.0 |
| FLAVOR | 0.5 | 0.5 | 0.7 | 0.7 | 0.9 | 0.5 |
| TITANIUM DIOXIDE | 0.5 | 0.9 | — | 0.5 | 0.5** | 0.5** |
| TALC | 0.1 | 0.1 | 0.1 | 0.1 | 0.1 | 0.1 |
| WAX | 0.1 | 0.1 | 0.1 | 0.1 | 0.1 | 0.1 |
| COLOR* | — | — | 1.4 | — | — | — |

*Lake color dispersed in xylitol solution
**Calcium carbonate used in place of titanium dioxide The above formulas are used to coat pellets by applying a xylitol/gum talha solution in multiple coats and air drying. Color or whitener is also mixed in the solution. After pellets have been coated and dried, talc and wax are added to give a polish.

Like xylitol, erythritol coating also requires a binder, film former, and hardener in the coating to make an acceptable product. The following formulations can be made:

TABLE 16

(DRY WEIGHT PERCENT)

| | EX. 115 | EX. 116 | EX. 117 | EX. 118 | EX. 119 | EX. 120 |
|---|---|---|---|---|---|---|
| ERYTHRITOL | 93.8 | 91.5 | 89.2 | 90.1 | 88.4 | 86.8 |
| GUM TALHA | 5.0 | 7.0 | 8.5 | 8.5 | 10.0 | 12.0 |
| FLAVOR | 0.5 | 0.4 | 0.7 | 0.7 | 0.9 | 0.5 |
| TITANIUM DIOXIDE | 0.5 | 0.9 | — | 0.5 | 0.5 | 0.5 |
| TALC | 0.1 | 0.1 | 0.1 | 0.1 | 0.1 | 0.1 |
| WAX | 0.1 | 0.1 | 0.1 | 0.1 | 0.1 | 0.1 |
| COLOR | — | — | 1.4* | — | — | — |

*Lake color dispersed in erythritol solution

The above formulas are used to coat pellets by applying a erythritol/gum talha solution in multiple coats and air drying. Color or whitener is also mixed in the solution. After pellets have been coated and dried, talc and wax are added to give a polish.

For coating formulas based on sorbitol, maltitol, lactitol, and isomalt, gum talha can be used as a binder and film former, and a crystallization modifier to help facilitate coating. Generally these polyols are more difficult to coat using only a straight syrup, but with proper technique a good smooth hard shell can be made. However, it may be preferable to add a dry charge to quicken the drying process before the pellets get too sticky. The following formulations may be used.

TABLE 17

(DRY WEIGHT PERCENT)

| | EX. 121 | EX. 122 | EX. 123 | EX. 124 | EX. 125 | EX. 126 |
|---|---|---|---|---|---|---|
| SORBITOL | 96.8 | 94.9 | 92.1 | 86.8 | 76.1 | 69.5 |
| SORBITOL POWDER | — | — | — | 10.0 | 20.0 | 25.0 |
| GUM TALHA | 2.0 | 4.0 | 6.0 | 2.0 | 3.0 | 4.0 |
| FLAVOR | 0.5 | 0.4 | 0.7 | 0.5 | 0.3 | 0.7 |
| TITANIUM DIOXIDE | 0.5 | 0.5 | 1.0 | 0.5 | 0.4 | 0.6 |

TABLE 17-continued (DRY WEIGHT PERCENT)

| | EX. 121 | EX. 122 | EX. 123 | EX. 124 | EX. 125 | EX. 126 |
|---|---|---|---|---|---|---|
| TALC | 0.1 | 0.1 | 0.1 | 0.1 | 0.1 | 0.1 |
| WAX | 0.1 | 0.1 | 0.1 | 0.1 | 0.1 | 0.1 |

Sorbitol powder is used to dry charge in the early stages of coating. Sorbitol, gum talha, and whitener is blended into a syrup and applied to pellets. After all coating is applied and dried, talc and wax are added to give a polish.

In a similar manner, coatings with maltitol, lactitol, and isomalt may be made in the coating formulas in Table 17 by replacing sorbitol with any one of the other polyols and sorbitol powder with the polyol powder. Like sorbitol, the other polyols may become sticky during the coating and drying process, so the dry powder charge may be needed to give the proper drying. In the later stages of the coating process less gum talha could be used and a more pure polyol syrup could be used to give a smooth surface. Also, the dry charge would only be used in the early stages of the coating process.

In addition to dry charging with the specific polyol, other ingredients may be added to the dry charge to help absorb moisture. These materials could be inert such as talc, calcium carbonate, magnesium carbonate, starches, gums like gum talha or other moisture absorbing materials. Also, powdered sweeteners or flavors could be added with the dry charge.

Some polyols such as sorbitol, maltitol, lactitol, or isomalt are not sufficiently sweet compared to sugar or xylitol, so high intensity sweeteners may be added to the coating such as aspartame, acesulfame K, salts of acesulfame, cyclamate and its salts, saccharin and its salts, alitame, sucralose, thaumatin, monellin, dihydrochalcone, glycyrrhizin, and combinations thereof. If a hot syrup is applied, heat may degrade the sweetener so only stable sweeteners should be used. Generally high intensity sweeteners are added with the polyol/gum talha solution to obtain an even distribution in the coatings.

Liquid flavors generally are not added throughout the coating but at specific points throughout the process. When flavor is added, less air is used for drying until the flavor coating is covered by the next coatings and dried. Flavors may be various spearmint, peppermint, wintergreen, cinnamon, and fruit flavors to yield a wide variety of flavored chewing gum products.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, indicated by the appended claims rather than by the foregoing description. All changes which come within the meaning and range of equivalency of the claims are to be embraced within their scope.

I claim:
1. A chewing gum composition comprising:
   a) about 5% to about 95% gum base;
   b) about 0.1% to about 10% of a flavoring agent, and
   c) about 56 to about 95% bulking and sweetening agents, the bulking and sweetening agents comprising gum talha.
2. The chewing gum composition of claim 1 wherein the gum talha is in the form selected from the group consisting of powder gum talha, gum talha syrup and mixtures thereof.
3. A chewing gum product including gum talha wherein the gum talha is used as a dusting agent on the surface of the gum.
4. A coated chewing gum product comprising a gum pellet coated with a hard coating, the hard coating comprising gum talha.
5. The method of claim 4 wherein the gum talha comprises 0.5 to 20% of the hard coating.
6. The method of claim 4 wherein the hard coating further comprises a polyol selected from the group consisting of xylitol, lactitol, maltitol, hydrogenated isomatolose, erythritol and mixtures thereof.
7. The method of claim 4 wherein the hard coating further comprises a flavor.
8. The method of claim 4 wherein the hard coating further comprises a high potency sweetener.
9. The method of claim 4 wherein the hard coating further comprises a sugar selected from the group consisting of sucrose, dextrose, maltose and mixtures thereof.
10. The method of claim 4 wherein the hard coating further comprises a coating modifier.
11. A method of making chewing gum comprising the steps of:
   a) coevaporating an aqueous solution comprising gum talha and a plasticizing agent to form a syrup, and
   b) mixing the syrup with gum base, bulking agents and flavoring agents to produce a gum composition.
12. A chewing gum composition sweetened at least in part by aspartame, the gum composition containing an effective amount of gum talha to stabilize the aspartame against degradation into non-sweetening derivatives.
13. A method of making chewing gum comprising the steps of:
   a) codrying a solution containing gum talha and a sweetener selected from the group consisting of sugar sweeteners, alditol sweeteners and high-potency sweeteners, and
   b) mixing the codried gum talha/sweetener with gum base and flavoring agents to produce a gum composition.
14. A liquid filled chewing gum product wherein the liquid fill comprises gum talha.

* * * * *

UNITED STATES PATENT AND TRADEMARK OFFICE
CERTIFICATE OF CORRECTION

PATENT NO. : 5,952,019
DATED : September 14, 1999
INVENTOR(S) : Robert J. Yatka et al.

It is certified that error appears in the above-identified patent and that said Letters Patent is hereby corrected as shown below:

In the Claims

In claim 1, line 4, delete "56" and substitute --5%-- in its place.

Signed and Sealed this

Twenty-ninth Day of May, 2001

Attest:

NICHOLAS P. GODICI

*Attesting Officer*   Acting Director of the United States Patent and Trademark Office